United States Patent
Mezzenga et al.

(10) Patent No.: US 7,432,311 B2
(45) Date of Patent: Oct. 7, 2008

(54) PROCESS FOR CREATING HIGH INTERNAL PHASE POLYMERIC EMULSIONS

(75) Inventors: Raffaele Mezzenga, St-Prex (CH); Glenn H. Fredrickson, Santa Barbara, CA (US); Edward J. Kramer, Santa Barbara, CA (US)

(73) Assignee: The Regents of the University of California, Oakland, CA (US)

( * ) Notice: Subject to any disclaimer, the term of this patent is extended or adjusted under 35 U.S.C. 154(b) by 127 days.

(21) Appl. No.: 11/084,727

(22) Filed: Mar. 18, 2005

(65) Prior Publication Data

US 2005/0261417 A1    Nov. 24, 2005

Related U.S. Application Data

(60) Provisional application No. 60/554,974, filed on Mar. 19, 2004, provisional application No. 60/554,871, filed on Mar. 19, 2004.

(51) Int. Cl.
*C08J 9/28* (2006.01)
(52) U.S. Cl. .............................. 521/64; 521/62; 521/63; 521/147; 521/150; 521/155; 521/157
(58) Field of Classification Search ................... 521/64, 521/62, 63, 147, 150, 155, 157
See application file for complete search history.

(56) References Cited

U.S. PATENT DOCUMENTS 6,897,247 B2 *   5/2005   Fredrickson ................. 521/64

OTHER PUBLICATIONS

Mezzenga, R., et al., "Templating organic semi-conductors via self-assembly of polymer colloids," 2003, *Science*, vol. 299, pp. 1872-1874.
Mezzenga, R., et al., "Tailoring morphologies in polymeric high internal phase emulsions by selective solvent casting," 2003, *Macromolecules*, vol. 36, pp. 4457-4465.
Mezzenga, R., et al., "High internal phase polymeric emulsions by self-assembly of colloidal systems," 2003, *Macromolecules*, vol. 36, pp. 4466-4471.

* cited by examiner

*Primary Examiner*—Robert D. Harlan
(74) *Attorney, Agent, or Firm*—Townsend and Townsend and Crew LLP

(57) ABSTRACT

A "high internal phase polymeric emulsion" ("HIPPE") composition is described which comprises an emulsion of a discrete phase (component A) and a continuous phase (component B), wherein the volume fraction of the discrete phase is the majority fraction (on a volume basis) of the total volume of the emulsion. A compatibilizer, component C, is used to lower the interfacial tension between the phases containing components A and B. A process is described for creating such HIPPE composition in which the A component is a colloidal polymer particle.

20 Claims, 1 Drawing Sheet

PROCESS FOR CREATING HIGH INTERNAL PHASE POLYMERIC EMULSIONS

CROSS-REFERENCES TO RELATED APPLICATIONS

The present application claims priority to U.S. Provisional Patent Application No. 60/554,871, filed Mar. 19, 2004, and U.S. Provisional Patent Application No. 60/554,974, filed Mar. 19, 2004, the teachings of which are incorporated herein by reference in their entireties for all purposes.

BACKGROUND OF THE INVENTION

The present invention relates to high internal phase polymeric emulsion ("HIPPE") compositions and to processes for their creation.

Emulsions based on water/oil/surfactant systems have been extensively investigated during the past few decades. (e.g., see Lissant, *Colloid Interface Sci.*, 22:462 (1966); Lissant et al., *J. Colloid Interface Sci.*, 42:201 (1973); Princen, *Colloid Interface Sci.*, 71:55 (1979); Westesen et al., *Colloids Surf. A*, 78:125 (1993); Groeneweg et al., *Colloids Surf A*, 91:207 (1994); Kunieda et al., *C. Langmuir*, 12:2136 (1996); Ozawa et al., *J. Colloid Interface Sci.*, 188:275 (1997); Mork et al., *J. Surfactants Deterg.*, 4:127 (2001).) High internal phase emulsions (HIPE) can be achieved in these systems, in which the dispersed phase is present in a volume fraction exceeding 0.74, i.e., the critical packing fraction of a face-centered-cubic (fcc) crystal. At these high volume fractions, it is no longer possible to closely pack monodisperse spheres, and therefore in order to maintain the high volume fraction, droplets with a narrow size distribution will rearrange into polyhedral structures. (e.g., see Lissant et al., *J. Colloid Interface Sci.*, 42:201 (1973); Kunieda et al., *C. Langmuir*, 12:2136 (1996); Ozawa et al., *J. Colloid Interface Sci.*, 188: 275 (1997).)

Multiple efforts have been made more recently to synthesize polymer-based HIPE, generally referred to as poly (HIPE) or HIPPE (e.g., see Haney et al., *Macromolecules*, 24:117 (1991); Sherrington, *Makromol. Chem. Symp.*, 70:303 (1991)), owing to the potential advantages these structures may have in many practical applications, such as membranes, foams, barriers, etc. The emulsification process in such a polymer-based HIPE is analogous to that of water-in-oil emulsions. An oil, such as petroleum ether or a low molecular weight compound phase, is generally dispersed dropwise in a solution of monomer, solvent, and surfactant so that an emulsion of up to 90% oil in the monomer bath can be obtained. (e.g., see Haney et al., *Macromolecules*, 24:117 (1991); Sherrington, *Makromol. Chem. Symp.*, 70:303 (1991); Cameron et al., *J. Chem. Soc., Faraday Trans.*, 92:1543 (1996); Cameron et al., *Macromolecules*, 30:5860 (1997).) Subsequently, the continuous monomer phase is polymerized and the solvent removed. The most extensively used monomers are styrene or divinylbenzene (DVB), which can be polymerized by a free radical polymerization process (e.g., see Tai et al., *Polym. Eng. Sci.*, 41:1540 (2001); Cameron et al., *Colloid Polym. Sci.*, 274:592 (1996); Hoisington et al., *Polymer*, 38:3347 (1997); Duke et al., *Polymer*, 39:4369 (1998); Cameron et al., *J. Mater. Chem.*, 10:2466 (2000); Tai et al., *Polymer*, 42:4473 (2001); Tai et al., *Polym. Eng. Sci.*, 41:1540 (2001)). Ionic, nonionic, and polymeric surfactants have also been used. (e.g., see Reynolds et al., *J. Phys. Chem. B*, 104:7012 (2000); Dickinson et al., *J. Colloid Interface Sci.*, 224:148 (2000); Pena et al., *J. Colloid Interface Sci.*, 244:154 (2001); Pons et al., *Colloid Polym. Sci.*, 275:769 (1997).) By following this procedure, a blend is produced in which the dispersed phase is liquidlike, and foams with very low density can be obtained by extracting this phase. (e.g., see Sherrington, *Makromol. Chem. Symp.*, 70:303 (1991); Cameron et al., *J. Mater. Chem.*, 10:2466 (2000); Tai et al., *Polymer*, 42:4473 (2001); Tai et al., *Polym. Eng. Sci.*, 41:1540 (2001); Bhumgara, *Filtr. Separat*, 32:245 (1995); Benicewicz et al., *J. Radioanal. Nuc. Chem.*, 235:31 (1998); Busby et al., *Biomacromolecules*, 2:154 (2001).)

Mezzenga et al., (e.g., see Mezzenga et al., *Macromolecules*, 36:4457 (2003) describes a solvent-based technique allowing the synthesis of HIPPE structures in which both phases can be polymeric without the need of polymerization. By following this technique, which involves appropriate selection of polymers, solvents, and block copolymer surfactant, HIPPE structures were produced in which a continuous minority phase is present in a volume fraction as low as 0.13. This technique was shown to be highly desirable for producing blends in which unique Theological, electrical, and barrier properties of the minority, percolating phase can be exploited. However, a less than desirable control of mean particle size has yet to be achieved with this technique, a limitation that represents a drawback if optical, transport, and mechanical properties of the final blend need to be uniform and controlled.

In principle, particle size can be controlled if colloidal latex particles with a narrow size distribution are used as discrete phase precursors to form HIPPE compositions. These latex particles are readily available today, owing to the large number of applications in which they are used, ranging from coating, rubber modification, and ion-exchange technologies (e.g., see Keddie, Mater. Sci. Eng., R., 21:101 (1997)) to photonic or colloidal crystal applications (e.g., see Egen et al., *Chem. Mater.*, 14:2176 (2002); Ye et al., *Appl. Phys. Lett.*, 79:872 (2001); Reese et al., *J. Colloid Interface Sci.*, 232:76 (2000)) Indeed, substantial advances have been made in the production of nearly monodisperse colloidal spheres as well as on colloidal crystallization. A reason is that for these applications colloidal particles with a narrow size distribution are required in order to achieve well-formed crystals starting from a colloidal dispersion. (e.g., see Park et al., *Langmuir*, 15:266 (1999); Yin et al., *Adv. Mater.*, 14:605 (2002).) One route to self-assemble colloidal particles into dense arrays is to make use of attractive depletion interactions, induced by dispersing colloidal particles and dissolving polymer chains in the same solution. (e.g., see Asakura et al., *J. Chem. Phys.*, 22:1255 (1954); Vrij, A. *Pure Appl. Chem.*, 48:471 (1976)) In this way, the polymer chains, excluded from a $R_g$-thick corona around the colloids, where $R_g$ is the radius of the gyration of the polymer, gain entropy on the approach of particles, whereas only a minor entropy loss is suffered by the colloidal particles. Other strategies to bind colloidal particles together have focused on surface interactions, by using charged particles (e.g., see Airenberg et al., *Phys. Rev. Lett.*, 84:2997 (2000)) or core-shell latexes (e.g., see Cardoso et al., *Colloids Surf A.*, 144:207 (1998)). Under the influence of these forces, colloidal systems have been shown to undergo complex phase transitions, and intriguing phase diagrams have been demonstrated (e.g., see Anderson et al., *Nature* (London), 416:6883 (2002)) However, all these methods have led, in the best case, to closely packed arrays of colloidal particles in a body centered cubic (bcc), hexagonal close packed (hcp), or face centered cubic (fcc) structure. As a consequence, if HIPPE structures without voids are to be produced by these methods, the volume fraction cannot exceed 0.74 for the dispersed phase, and the continuous phase, formed by another polymer, has to be present at a volume fraction equal to or beyond 0.26.

As such, methods for the economical production of stable high internal phase polymeric emulsions, where both discrete and continuous phases are composed of polymeric fluids or solids, have been limited.

Therefore, there exists a need to produce HIPPE compositions, wherein the morphologies of both the continuous and dispersed phases can be controlled.

BRIEF SUMMARY OF THE INVENTION

A "high internal phase polymeric emulsion" ("HIPPE") composition is described which comprises an emulsion of a discrete phase (component A) and a continuous phase (component B), wherein the volume fraction of the discrete phase is the majority fraction (on a volume basis) of the total volume of the emulsion. The discrete phase is in the form of particles or colloids. In a preferred embodiment, the composition has substantially no voids. A compatibilizer, component C, is used to lower the interfacial tension between the phases containing components A and B.

In one aspect, the embodiments of the present invention are directed toward a process for preparing high internal phase polymeric emulsion compositions from a broad range of polymers. As used herein, a high internal phase emulsion morphology is characterized by a discrete phase that occupies 80% or more by volume of the composition and a continuous phase that occupies the remaining 20% or less of the composition. The embodiments of the present invention enable the construction of plastic materials having novel transport and barrier properties at potentially low costs, by using low cost materials that form the discrete phase in combination with materials having the desired properties as the lower volume fraction continuous phase.

The embodiments of the present invention provide a procedure to synthesize poly(HIPE) based on self-assembly and collapse of colloidal dispersions. The examples show that properly designed block copolymers added as surfactant to the colloidal dispersion can be used to pack colloidal systems beyond the volume fraction of 0.74 and maintain the dispersed phase embedded in a continuous percolating phase whose volume fraction can be as low as 0.10. Thus, compared to the other procedures available to synthesize poly(HIPE), the embodiments of the present invention enable a greater control of the morphology of both the continuous and dispersed phases.

In one embodiment, the present invention provides a process for creating a polymeric high internal phase emulsion composition of two plastic materials A and B. The process includes dissolving a compatibilizer C containing a B part in a selective solvent for B, to form a solution; dispersing crosslinked polymeric particles of polymer A within the solution; and removing the solvent from the solution to form a dried polymeric high internal phase emulsion composition.

In another embodiment, the present invention provides a method of producing a semiconducting polymer blend. The method includes dissolving a chaperone polymer, that is the polymer hosting the semiconducting polymer, a doped pi-conjugated polymer, and a block copolymer, along with crosslinked polymer particles, in a common solvent to form a solution comprising a colloidal system; and removing the solvent from the solution to form a dried semiconducting polymer blend, wherein the block copolymer is synthesized such that one block is compatible with the surface of the colloidal system and the other hosts the doped pi-conjugated polymer.

For a further understanding of the nature and advantages of the invention, reference should be made to the following description taken in conjunction with the accompanying figures.

DETAILED DESCRIPTION OF THE INVENTION

Figure 1:
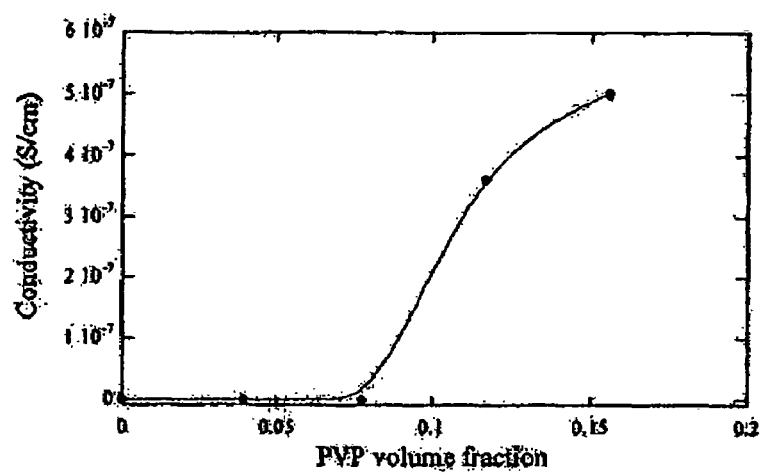
FIG. 1 is a graph of specific (proton) conductivity of the polyHIPE blend measured vs. the volume fraction of the percolating PVP phase. Conductivity onset is measured at PVP volume fractions between 0.08 and 0.12, indicating the percolation threshold at a volume fraction as low as 0.10.

A "high internal phase polymeric emulsion" ("HIPPE") composition is described which comprises an emulsion of two or more phases, a discrete phase and a continuous phase, wherein the volume fraction of the discrete phase is the majority fraction (on a volume basis) of the total volume of the emulsion. In addition, the composition has substantially no voids. The term "component A" is used to designate the discrete phase and the term "component B" is used to designate the continuous phase. The interfacial tension between the phases containing components A and B is lowered using a compatibilizer, designated "component C". It is understood that these are merely terms for explanation purposes and are not meant to limit the composition to only these three specific components.

For further clarification, the term:

(a) "phase" means a portion of a physical system that is uniform throughout, has defined boundaries and, in principle, can be separated physically from other phases.

(b) "high internal phase polymeric emulsion" ("HIPPE") means an emulsion of two or more phases wherein the volume fraction of the discrete phase is the majority fraction (on a volume basis) of the total volume of the emulsion and, in one embodiment, the discrete phase represents more than about 80% by volume of the total volume of the emulsion.

(c) "emulsion" means a stable or metastable mixture of two or more immiscible liquids held in suspension by a compatibilizer (i.e. emulsifier). An "emulsion" includes both a continuous phase as well as a discrete (i.e. discontinuous) phase that is dispersed throughout the continuous phase. The term "emulsion" used here refers to both the liquid precursor and the solid composition in cases where the emulsion is dried to form a solid composition.

(d) "polymer" means a macromolecule composed of at least three of the same type of monomeric moieties. Typically, a polymer is formed by the chemical union of monomeric units.

(e) "compatibilizer" means a molecular species that, when mixed with two immiscible fluids A and B, is preferentially located at the interface between the two phases and serves to reduce the interfacial tension between the phases. Compatibilizers include surfactants, block copolymers, random copolymers, and graft copolymers.

(f) "discrete phase" means a phase within a material sample that is separated into disconnected pieces, such that it is not possible to find a connected path of material points lying entirely within that phase and that spans macroscopically ("percolates") across the material sample.

(g) "continuous phase" means a phase within a material sample that contains at least one connected path of material points lying entirely within that phase and that spans macroscopically ("percolates") across the material sample.

(h) "graft" copolymer means a macromolecule that has a central backbone composed of one or more repeated monomeric units to which is chemically affixed one or more "graft" macromolecules, each of which is chemically distinct from the backbone and is itself composed of one or more repeated monomeric units.

(i) "block" copolymer means a macromolecule with two or more sections, each chemically distinct from the other sections and each composed of one or more repeated monomeric units.

(j) "random" copolymer means a macromolecule that is composed of a stochastic sequence of two or more distinct monomeric units.

(k) "substantially no voids" means that the composition has a void volume fraction less than about 0.25. In one embodiment, the void volume fraction may be correlated to the density of the composition. For example, in an embodiment of the present invention, the density of the HIPPE is greater than about 100 mg/cc.

(l) "mixing" is equivalent to blending and/or agitating and means that the materials are sufficiently dispersed to form an emulsion. Suitable devices include, but are not limited to, impellers, propellers, paddles, turbines, motionless mixers, extruders, and recycle loops.

(m) "selective solvent for a component" means a solvent in which that component has greater solubility than all other components of the composition.

The examples show that properly designed block copolymers added as compatibilizer (component C) to a colloidal dispersion (components A+B) can be used to pack colloidal systems beyond the volume fraction of 0.74 and maintain the dispersed phase (component A) embedded in a continuous percolating phase (component B) whose volume fraction can be as low as 0.10. Thus, compared to the other procedures available to synthesize polyHIPE, the embodiments enable a greater control of the morphology of both the continuous and dispersed phases.

In one embodiment, a high internal phase polymeric emulsion composition comprises a discrete phase comprising component A, wherein component A is a polymer, monomer or a mixture thereof; a continuous phase comprising component B, wherein component B is a polymer; component C, wherein component C is a compatibilizer; wherein the discrete phase represents greater than 0 up to less than 100%, more typically at least about 80% by volume of the total components A, B, and C and the continuous phase typically represents no greater than 20% by volume of the total components A, B, and C.

In a preferred embodiment, a process for creating a polymeric high internal phase emulsion composition may include, for example, the steps of: (1) dissolving component B and component C (e.g., a copolymer AB) in a selective solvent for polymer B; (2) dispersing polymer A in the form of crosslinked polymeric particles (e.g., microbeads) within the solution; (3) removing the solvent by, for example, slow evaporation, spray drying or flashing and (4) annealing the dried composition at elevated temperatures. Preferably, component A is added to the solution in the form of crosslinked microbeads or crosslinked polymer particles, such as, for example those prepared by emulsion, microemulsion, suspension, or dispersion polymerization techniques, or as an emulsion or colloidal dispersion. In addition, the dispersion of component A within the solution is by means of shear agitation and/or sonification. Furthermore, the annealing may be carried out at elevated temperatures to help improve the structural order of the high internal phase polymeric emulsion composition. As used herein, elevated temperatures include temperature ranges higher than the glass transition temperature ($T_g$) of either of the copolymer AB or component A.

The process for creating a polymeric high internal phase emulsion composition of two plastic materials A and B, described above, may include several alternative embodiments. In a first alternative process, polymer B may be a variable molecular weight polymer. In a second process, polymer B may be reduced in concentration in step 1, or omitted altogether.

In another alternative embodiment of the process, the AB block copolymer can be of a variable molecular weight and composition, or, the copolymer may have different architectures including, AB diblock, ABA triblock and so on.

In another alternative embodiment of the process, the crosslink density within the polymeric particles of polymer A are varied in order to modify the Theological and solid state properties of the composition in useful ways, while maintaining the HIPPE morphology.

In a fourth alternative embodiment of the process, the surface of the polymeric particles of polymer A are treated so as to affect HIPPE composition properties, as well as enabling a selective control of the process of producing the composition.

Component A

Component A denotes the high-volume fraction discrete phase of the HIPPE composition and may be a polymer, copolymer, monomer or a mixture thereof.

In one embodiment, component A comprises one or more monomers. Suitable monomers include styrene, vinyl toluene, alpha-methyl styrene, divinyl benzene, isoprene, butadiene, methyl methacrylate, acrylonitrile, vinyl chloride, vinyl acetate, maleic anhydride, and thermoset monomers (e.g. epoxies, propylene oxide).

In a further embodiment, the monomer component may also optionally comprise one or more crosslinking agents, catalysts and polymerization advancers. Suitable crosslinking agents include sulfur, selenium, sulfur monochloride, formaldehyde, di-isocyanates, polyamines, and peroxides. The crosslinking agent will generally comprise less than 5% by weight of the composition. Some of these crosslinking agents may be incorporated as a noncrosslinked monomer.

In yet another embodiment, component A comprises one or more polymers. Suitable polymers include: polyethylenes, including HDPE, LDPE, LLDPE, VLDPE, and ULDPE; polypropylenes; copolymers of ethylene and propylene, including EPR, EPDM, EVA, EAA and EVOH; copolymers of ethylene with higher alpha-olefins, including ethylene-butene, ethylene-hexene, and ethylene-octene copolymers; polystyrenes; ethylene styrene; copolymers of styrene, including SBR, SBS, SIS, SEBS, SAN, SMA, and ABS; hydrogenated polystyrene (polyvinylcyclohexane); hydrogenated copolymers of styrene; polybutadienes; polyisoprenes; polyvinyl chlorides; vinyl chloride copolymers; polyamides; polyimides; polycarbonates; polyesters, including PET, PBT; PETG, and polyarylates; acrylic polymers including PMMA, PMMA copolymers; polyethers, including polyetherimides, polyetherketones, polyethersulfones, polyethylene glycol, and polypropylene glycol; polyphenylene oxides and sulfones; polyvinylidine chlorides and fluorides; natural rubbers and chemically modified natural rubbers; partially polymerized thermosets (e.g. B-stage thermosets) silicone rubbers; thermoplastic polyolefin rubbers; and polyurethanes, including TPUs. While any molecular weight polymer may be used, a molecular weight in the range of 1,000-5,000,000 Daltons is preferred.

The volume fraction of component A is the majority fraction (on a volume basis) of the total volume of the emulsion and, in one embodiment, component A represents between greater than 0 and up to 100% by volume of the total volume of the emulsion. Preferably, component A is added to the solution in the form of crosslinked microbeads or crosslinked polymer particles, such as, for example those prepared by emulsion, microemulsion, suspension, or dispersion polymerization techniques, or as an emulsion or colloidal dispersion.

Component B

Component B denotes the continuous phase of the HIPPE composition and is a polymer. In one embodiment, component B comprises one or more polymers. Suitable polymers include: polyethylenes, including high, low, very low, and ultra low density polyethylene (HDPE, LDPE, LLDPE, VLDPE, and ULDPE); polypropylenes; copolymers of ethylene and propylene, including EPR, EPDM, ethylenevinyl acetate (EVA), EAA and ethylenevinylalcohol (EVOH); copolymers of ethylene with higher alpha-olefins, including ethylenebutene, ethylene-hexene, and ethylene-octene copolymers; polystyrenes; ethylene styrene; copolymers of styrene, including SBR, SBS, SIS, SEBS, SAN, SMA, and ABS; hydrogenated polystyrene (polyvinylcyclohexane); hydrogenated copolymers of styrene; polybutadienes; polyisoprenes; polyvinyl chlorides; vinyl chloride copolymers; polyamides; polyimides; polycarbonates; polyesters, including PET, PBT; PETG, and polyarylates; acrylic polymers including PMMA, PMMA copolymers; polyethers, including polyetherimides, polyetherketones, polyethersulfones, polyethylene glycol, and polypropylene glycol; polyphenylene oxides and sulfones; polyvinylidine chlorides and fluorides; natural rubbers and chemically modified natural rubbers; partially polymerized thermosets; silicone rubbers; thermoplastic polyolefin rubbers; polyurethanes, including TPUs; and conjugated polymers including polythiophenes, polypyrroles, and polyanilines; and other semiconducting polymers, such as polyfluorenes, poly(n-vinylcarbazole) ("PVK"), polyethylenedioxythiophene:polystyrenesulfonate ("PEDOT:PSS"), etc.

The polymer may be included in the continuous phase in an amount in the range of about 0.1 wt. % to about 100 wt. % based the volume of the total emulsion composition. Polymers having a wide range of molecular weights, for example, molecular weight in the range of 1,000 to 5,000,000 Daltons, may be used.

The polymer of component B may be produced by polymerizing one or more monomers during the formation of the HIPPE composition. Suitable monomers that may be used to produce component B include: vinyl monomers, such as vinyl acetate, styrene, vinyl toluene, alpha-methyl styrene, vinyl chloride; multifunctional monomers such as di-vinyl benzene; dienes such as isoprene and butadiene; acrylic monomers such as methyl methacrylate; esters; epoxies; ethers; urethanes; silicones; monomers leading to intrinsically conducting polymers, including thiophenes, pyrroles, and anilines and monomers that polymerize with styrene (e.g. acrylic nitrate, maleic anhydride). The monomers may also optionally be comprised of one or more crosslinking agents. Suitable crosslinking agents include sulfur, selenium, sulfur monochloride, formaldehyde, di-isocyanates, polyamines, polyalcohols, and peroxides. For example, component B may be produced by using about 0.0001% to about 5% by weight of crosslinking agent, and about 99.9999% to about 95% by weight of monomer(s).

The continuous phase of the HIPPE composition may also contain a polymerization initiator, such as a free radical initiator component. However, polymerization and cross-linking of the monomer(s) in the continuous phase may be accomplished without a polymerization initiator, for example, via exposing the emulsion to ultraviolet radiation or other polymerization techniques known to those skilled in the art. Suitable free radical initiators include acyl peroxides, alkyl peroxides, hydroperoxides, peresters, AIBN, disulfides, and tetrazenes. In a further embodiment, components A and/or B may be any thermoplastic material. Examples of suitable thermoplastics include polyethylenes, including HDPE, LDPE, LLDPE, VLDPE, and ULDPE; polypropylenes; copolymers of ethylene and propylene, including EPR, EPDM, EVA, EAA and EVOH; copolymers of ethylene with higher alpha-olefins, including ethylene-butene, ethylene-hexene, and ethylene-octene copolymers; polystyrenes; ethylene styrene; copolymers of styrene, including SBR, SBS, SIS, SEBS, SAN, SMA, and ABS; polybutadienes; polyisoprenes; polyvinyl chlorides; vinyl chloride copolymers; polyamides; polycarbonates; polyesters, including PET, PBT; PETG, and polyarylates; acrylic polymers including PMMA, PMMA copolymers; polyethers, including polyetherimides, polyetherketones, polyethersulfones, polyethylene and polypropylene oxides; polyphenylene oxides and sulfones; polyvinylidine chlorides and fluorides; natural rubbers and chemically modified natural rubbers; partially polymerized thermosets; thermoplastic polyolefin and silicone rubbers; polyurethanes, including TPUs; and certain conjugated polymers including polythiophenes, polypyrroles, and polyanilines. In yet a further embodiment, components A and/or B may be a thermoset. Examples of suitable thermosets include phenolic resins, urea-formaldehyde resins, melamine-formaldehyde resins, polyester resins, vinyl ester resins, styrene esters, epoxide resins, polyurethanes, polyisocyanurates, furan resins, and silicone resins.

Components A and/or B may be any percentage of plastic, rubber and/or crosslinked resin.

In one embodiment, polymer A may be selected, for example, based on price—a lower cost material than component B because polymer A is the major phase. Examples of lower cost thermoplastic polymers may include, but are not limited to: polyolefins, including polyethylenes, polypropylenes, and copolymers with higher alpha-olefins; polyamides, including nylon 6-6; polyesters, including PET; PBT; PVCs; polystyrene and copolymers of polystyrene (e.g. SMA, SAN, ABS); rubbers (e.g. olefin rubbers, polybutadienes, polyisoprenes, SBS, natural rubbers); acrylics such as PMMA. Examples of lower cost thermosets include, but not limited to: phenolics, epoxies, polyurethanes, vinyl ester resins, styrene esters.

In yet another embodiment, component A maybe a particle composed of the polymeric material discussed above. For example, component A may be a particle composed of polystyrene.

In another embodiment, polymer B is selected based on, for example: (a) price—a higher cost material than component A (e.g. since only minor amounts need be used, but the HIPPE composition will have some of the superior properties of the more expensive component B because it is located in the continuous phase); (b) biodegradable; (c) electrical, ionic and/or thermal conductivity; (d) barrier properties; and/or (e) environmental and chemical resistance. Based on one of these criteria, examples of component B include, but are not limited to: EVOH; fluorinated polymers, (e.g. TFE, PVDF); epoxies; polyamides, polycarbonates; polyesters, including PETG, and polyarylates; polyethers, including polyetherimides, polyetherketones, polyethersulfones, polyethylene and polypropylene oxides; polyphenylene oxides and sulfones; polyvinylidine chlorides; silicones; polyurethanes; polylactic acid; polyhydroxy alkonates and conjugated polymers including polythiophenes, polypyrroles, and polyanilines.

Component C

Component C denotes the compatibilizer of the HIPPE composition. The role of the compatibilizer is to lower the interfacial tension between the phases containing components A and B and to otherwise modify the interfacial properties so as to stabilize the HIPPE morphology. The compatibilizer is selected so that one part has a greater affinity to component B and the other part has a greater affinity to component A. In an embodiment, the compatibilizer is selected so that one part has a greater affinity to component B than the other part's affinity to component A. Such a compatibilizer has a higher solubility in component B (or its precursor) than in component A (or its precursor).

In one embodiment, block copolymer compatibilizers are employed to establish the emulsion. Specifically, in one example, AB diblock copolymer compatibilizers are employed where chains of the two immiscible components (i.e. A and B) are bonded together to form a surfactant-like molecule (component C). As such, the presence of the AB diblock copolymer acts an emulsifier. In another embodiment, random copolymer compatibilizers are employed to establish the emulsion. Suitable compatibilizers include: diblock and triblock copolymers such as styrene-butadiene, styrene-butadiene-styrene, styrene-isoprene, styrene-isoprene-styrene, methylmethacrylate-styrene, methylmethacrylate-butadiene, styrene-butadiene-methylmethacrylate, ethylene oxide-propylene oxide, etc; hydrogenated versions of the above such as SEBS, SEPS, etc; styrenic random copolymers such as SBR, SMA, SAN, SMMA, and ABS; and polyolefin random copolymers such as EPR, EVA, EVOH, EVC, etc. In one embodiment, the ratio (on a volume basis) of component B to compatibilizer C is about 1:1. Other ratios (on a volume basis) of component B to compatibilizer C include continuous variations between 10:1 and 1:10.

Processing Conditions for Obtaining HIPPE compositions (1) Formation of HIPPE

In one embodiment, a high internal phase polymeric emulsion composition may be prepared, for example, by a process comprising the steps of: (a) forming a continuous phase by dissolving a compatibilizer in a monomer, or in a mixture of monomers (precursor to component B); (b) sufficient blending of component A to form a discrete phase and maintain the continuous phase of compatibilizer plus monomer(s); (c) polymerizing the monomer(s) in the phases to form discrete particles within a continuous phase; and (d) final curing and/or drying to form the resulting HIPPE composition with component A as the discrete phase and component B as the continuous phase.

In another embodiment where the starting components are polymers, a high internal phase polymeric emulsion composition may be prepared, for example, by a process comprising the steps of: (a) adding component B to form a continuous phase; (b) blending in a compatibilizer; and (c) adding component A to component B plus compatibilizer at a sufficiently slow rate and at sufficient mixing conditions to maintain component B in the continuous phase.

One specific example of the ratio of the components is (by volume) 2% of component B, 2% of compatibilizer C, and 96% of component A. Other ratios include (by volume) X % component B, Y % component C, and (100-X-Y)% component A, where X and Y can be continuously varied between 0.01 and 20.0.

In yet another embodiment, the high internal phase polymeric emulsion is produced by the steps comprising: (a) mixing component B and component C; (b) feeding component A at a sufficiently slow rate into the mixture while sufficiently stirring the mixture in order to maintain phase A in the discrete phase; and (c) sufficient cooling the composition to "lock in" the high internal phase polymeric emulsion morphology by initiating a vitrification or crystallization process.

A further example of a process for creating a high internal phase polymeric emulsion of the present invention having monomer A and a starting monomer for component B comprises the steps of: (a) mixing a starting monomer for component B and compatibilizer C to produce a continuous phase; (b) feeding monomer A at a sufficiently slow rate and a sufficient mixing rate in order to maintain monomer A in a discrete phase; (c) thermally initiating polymerization of either or both monomer A and/or the starting monomer for component B; and, if necessary, or in the alternative, (d) UV polymerization of either or both monomer A and/or the starting monomer for component B; and (e) cooling the mixture below the $T_g$ and/or $T_m$ of one or both of the monomers.

In another example of a process for the high internal phase polymeric emulsion having monomer A and a starting monomer for component B comprises the steps of: (a) mixing the starting monomer for component B and compatibilizer C; (b) feeding monomer A at a sufficiently slow rate and a sufficient mixing rate in order to maintain monomer A in a discrete phase; (c) thermally initiating polymerization of either or both monomer A and/or the starting monomer for component B; and, if necessary, or in the alternative, (d) UV polymerization either or both monomer A and/or the starting monomer for component B; and (e) crosslinking one or both of the monomers.

In yet a further example, the high internal phase polymeric emulsion may be produced by a melt blend process (e.g. in an extruder) wherein component A is a particle and is added to components B and compatibilizer C, which is soluble in B.

In a further example of a process for the high internal phase polymeric emulsion of the present invention having monomer A and a starting monomer for component B to form compatibilizer C in situ by: (a) feeding monomer A into the starting monomer for component B; and (b) sufficiently mixing the material of step (a) so as to react monomer A with the starting monomer for component B to form compatibilizer C, while maintaining B as a continuous phase.

Another example of a process for the high internal phase polymeric emulsion having monomer A and the starting monomer for component B as the starting components comprises the steps of: (a) premixing compatibilizer C with the starting monomer for component B; (b) feeding monomer A at a sufficiently slow rate and a sufficient mixing rate in order to maintain monomer A in a discrete phase; and (c) polymerizing by UV or thermal treatment.

In yet another example of a process for the high internal phase polymeric emulsion having monomer A and component B as a polymer comprises the steps of: (a) mixing the polymer of component B and compatibilizer C; (b) feeding monomer A at a sufficiently slow rate and a sufficient mixing rate in order to maintain monomer A in a discrete phase; (c)

thermally initiating polymerization of the monomer A or UV polymerization of monomer A; and (e) crosslinking the resulting component A.

In another variation of the above, component A may be one or more monomers with optional solvents, blowing agents and/or initiators. Suitable solvents include water, supercritical $CO_2$, fluorinated surfactants, toluene, cyclohexane, acetone, and THF. In a further embodiment, the HIPPE composition may be produced in a solventless process. For example, components A and B may be a thermoplastic with component B being heated above its $T_g$ and/or $T_m$ with a block copolymer compatibilizer and with sufficient agitation to maintain the continuous phase.

In yet another example of a process for creating a high internal phase polymeric emulsion, component A can consist of one or more reactive monomers, while component B can be a mixture of a polymer B and a selective solvent for polymer B. The HIPPE composition is produced by the steps of: (a) mixing the polymer and solvent of component B with compatibilizer C; (b) feeding component A into the mixture at a sufficiently slow rate and a sufficient mixing rate in order to maintain component A in a discrete phase; (c) initiating a thermal or UV polymerization of the reactive monomers in component A; and (d) removing the selective solvent within component B by a drop in pressure and/or elevation in temperature. In a further embodiment, steps (c) and (d) are carried out in reverse order, or simultaneously.

A further example of a process for the high internal phase polymeric emulsion of the present invention having component A as a polymer and component B comprises the steps of: (a) mixing components B and compatibilizer C; (b) feeding component A at a sufficiently slow rate and a sufficient mixing rate in order to maintain component A in a discrete phase; and (c) cooling the mixture of step b) to lock the morphology.

In one embodiment, the process starts off with the minor phase (component B) and the major phase (component A) is added at a sufficient rate to maintain the minor phase as the continuous phase.

In another embodiment of a process for the high internal phase polymeric emulsion, the steps comprise: 1) forming a stable high internal phase polymeric emulsion composition; and 2) polymerizing/curing this stable emulsion under conditions suitable for forming a solid polymeric structure.

It is understood that, the HIPPE compositions may be prepared by low-cost compounding methods, using conventional polymer processing equipment. Moreover, in yet another embodiment, the HIPPE compositions have sufficient stability against time and temperature annealing, as well as subsequent processing.

In a further embodiment, the HIPPE composition can be formed by subjecting the combined phases to shear agitation. Shear agitation is generally applied to an extent and for a time period necessary to form a stable emulsion. Such a process can be conducted in either batchwise or continuous fashion and is generally carried out under conditions suitable for forming an emulsion where the continuous and discrete phases are dispersed to such an extent that the resulting polymeric structure will have the requisite mechanical characteristics. Emulsification of the phase combination includes, but is not limited to, the use of a mixing or agitation device such as a pin impeller, extruder, or compounder.

(2) Polymerization/Curing of the HIPPE

In one embodiment, the HIPPE composition formed may be collected in a suitable reaction vessel. For example, the temperature at which the HIPPE may enter the vessel may be the same as the polymerization/curing temperature. Suitable polymerization/curing conditions will vary depending upon the monomer and/or polymer and other makeup of the phases of the emulsion (especially the compatibilizer systems used), and the type and amounts of polymerization initiators used. Frequently, however, suitable polymerization/curing conditions will involve maintaining the HIPPE composition at temperatures above about 160 degrees Celsius for periods ranging from less than a minute to several hours.

Once the HIPPE composition has been polymerized/cured, the HIPPE composition may be cut or sliced into a sheet-like form, or machined into desirable shapes.

The relative amounts of the polymer/monomer A phase to polymer B phase used to form the HIPPE composition may affect the structural, mechanical and/or performance properties of the resulting polymeric composition. For example, the ratio of polymer/monomer A to monomer/polymer B in the emulsion may influence the density, modulus, heat resistance, clarity, barrier properties, toughness, tensile and flexural strength, etc. The emulsions used to prepare the HIPPE composition may have a ratio of polymer/monomer A phase to polymer B phase ranging from about 4:1 to about 98:1 on a volume basis.

(3) Characteristics of HIPPE Composition:

The HIPPE composition consists of substantially no voids. In one embodiment, the HIPPE composition has a void volume less than about 5%. In another embodiment, the void volume may be correlated to the density of the composition. For example, in an embodiment, the density of the HIPPE composition is greater than about 100 mg/cc.

Depending on the formulations, the HIPPE compositions may exhibit one or more of the following properties:

(a) Low Cost Barrier—a higher cost barrier polymer may be diluted down to as little as 1% into a lower cost, commodity plastic (e.g. polyethylene, polypropylene, polystyrene), and yet still preserve much of its desirable barrier characteristics against species such as oxygen, water, and $CO_2$. In another example, HIPPE compositions may replace higher cost, fluorinated polymers that are used in barrier applications.

(b) Unique Mechanical, Chemical, Physical, and Rheological Properties—by virtue of the minority phase being continuous and the majority phase discrete, HIPPE structures can yield unique property sets. The continuous phase of the HIPPE can be utilized for specific mechanical, rheological, or transport applications, for example to conduct electrons or protons. Proton conductivity proves to be a way to detect the threshold for percolation of the B (e.g. PVP) phase. In another example, the HIPPE composition could be further enhanced by the use of thermoset polymers for either the majority or minority phase. For example, an epoxy or other thermoset may be cured inside the cells of a HIPPE structure (discrete phase), while the cell walls (continuous phase) are thermoplastic. The overall structure may be highly filled and thus have high modulus, yet might still be processable as a thermoplastic. In another example, the minority continuous phase employs a polymer that withstands aggressive chemicals and thus, a low cost, chemically resistant polymer blend is produced. In a further example, a HIPPE composition may be produced for an application such as the automotive industry having the combined properties of two or more of the following: stiffness; toughness; resistance to oil; heat resistance; processibility; and/or low price.

(c) Low Cost, High Heat Plastics—HIPPE structures may allow higher cost, high-heat thermoplastics, such as polysulfones, to be used in very small proportions, yet still provide structural integrity at elevated temperatures.

(d) Low Cost, Electrical or Ionic Conductors—the continuity of the minor phase of HIPPE plastic structures may be exploited with higher cost, yet high performance, polymers that are either electrical or ionic conductors. The HIPPE structure allows such polymers to be diluted down to very low levels with lower cost engineering or commodity plastics to reduce overall cost.

(e) Bioactive Materials can also be incorporated which are released by diffusion and/or degradation of the polymers.

Commercial Applications

The HIPPE compositions may be used in the following commercial applications:

(a) Conductivity—For applications requiring both conductivity and good mechanical properties, doped pi-conjugated polymers are blended with tougher insulating polymer matrices, resulting in mechanically resistant and easy-to-process semiconducting polymer blends. Applications for these types of compositions include electromagnetic shielding, corrosion resistant coating (typically of metal), and anti-static coating.

(b) Architectural Coatings—the compositions may be used if appropriately formulated for the provision of protective coatings, polishes, varnishes, lacquers, paints, sealants and adhesives.

(c) Barriers—the HIPPE compositions may provide exceptional barriers to water, moisture vapor, grease and oil, among others.

(d) Drug Delivery—the compositions can be used to deliver biologically active drugs to patients.

Semiconducting Polymer Blends

The examples described above emphasize the use of the procedure for producing high internal phase ratio polyHIPE structures in which the continuous phase is exploited for specific applications. One application of exploiting the continuous phase for specific applications is directed to a process for producing semiconducting polymer blends in which a doped pi-conjugated polymer is forced into a three-dimensionally continuous minor phase by the self-assembly of colloidal particles and block copolymers. The resulting cellular morphology is a high-internal phase polymeric emulsion. Compared with traditional blending procedures, the process reduces the percolation threshold for electrical conductivity by a factor of 10, increases the conductivity by several orders of magnitude, and simultaneously improves thermal stability. Additional applications for semiconducting polymer blends require only minimal concentrations of doped pi-conjugated polymer.

For applications requiring both conductivity and good mechanical properties, doped pi-conjugated polymers are blended with tougher insulating polymer matrices, resulting in mechanically resistant and easy-to-process semiconducting polymer blends (e.g., see Kang et al., *Synth. Methods*, 101:696 (1999); Olinga et al., *Macromolecules*, 33:2107 (2000); Frayasse et al., *Macromolecules*, 34:8143 (2001)). In these blends, conductivity is achieved by percolation of the dispersed doped pi-conjugated polymer phase hosted in an insulating polymer matrix. The doped pi-conjugated polymer volume fraction at the percolation threshold, $f_p$, plays a role in determining the blend's electrical conductivity, $\sigma$, which scales with the doped pi-conjugated polymer volume fraction just above the threshold (e.g., see D. Stauffer, *Introduction to Percolation Theory* (Taylor and Francis, Philadelphia, 1985)) as $$\sigma \sim (f-f_p)^t \qquad \text{Eqn. (1)}$$

where f is the volume fraction of doped pi-conjugated polymer and the exponent t has a theoretical value of 2. Although for spherical particles $f_p$ is predicted to be 0.16, this value rapidly decreases when the dispersed phase is present in more elongated shapes, such as fibrils, which can be produced by arresting spinodal decomposition processes. For example, in solvent spin-cast films of poly(methyl methacrylate) and protonated polyaniline (PANI), $f_p$ has been shown to be as low as 0.01 (e.g., see Yang et al., *Synth. Methods*, 53:293 (1993); 13M. Reghu et al., *Macromolecules*, 26:7245 (1993)). This value can be further reduced upon faster solvent evaporation (e.g., see Frayasse et al., *Mol. Cryst. Liq. Cryst.*, 354:1099 (2000)). However, only thin films can be obtained with these procedures, and the conductive morphologies are unstable when annealed at temperatures above the glass transition temperature ($T_g$) of the matrix polymer.

To overcome these drawbacks, the embodiments of the present invention provide a different strategy for driving the doped pi-conjugated polymer into a stable, continuous, percolating phase. Using these procedures, semiconducting blends are produced that are processable as both films and bulk samples and that combine electrical conductivity with thermal stability.

In accordance with the embodiments of the present invention, blends are produced using a three-phase system in which one homopolymer, component A, present as a high-volume fraction discrete (nonpercolating) phase, confines two other polymers having component B, a "chaperone" polymer and a doped pi-conjugated polymer, into a continuous double-percolating structure of low volume fraction. There is a theoretical advantage in confining the doped pi-conjugated polymer to a low-volume fraction continuous phase. For a two-phase composite material of which only one phase is continuous and conductive, the overall conductivity can be approximated by $\sigma_o V$, where V is the volume fraction of the conductive phase and $\sigma_o$ is its specific conductivity. If conductivity in the continuous phase is achieved by percolation of a conductive component, $\sigma_o$ still scales as in Eq. 1, but because the same amount of doped pi-conjugated polymer is concentrated in V, f/V should be substituted for f in Eq. 1. This leads to $$\sigma \sim (f - f_p V)^t V^{(1-t)} \qquad \text{Eqn. (2)}$$

which highlights the marked decrease of the percolation threshold to $f_p V$ when $V \ll 1$.

EXAMPLE 1

Formation of HIPPE Using a Colloidal Dispersion

The examples described below demonstrate a new procedure to synthesize HIPPE blends, which enables the control of the morphologies of both the continuous and dispersed phase to an extent well beyond that possible with other currently available techniques. The embodiments make use of narrow size distribution colloidal particles as precursors of the final dispersed phase and properly designed block copolymers to build up the continuous phase. The block copolymer is designed in such a way to have two immiscible blocks, one of which is short and compatible with the colloid and the other of which is long and soluble in the solvent used to disperse the colloid. The examples described below use polystyrene emulsion particles, polystyrene-poly(2-vinylpyridine) block copolymer, and ethanol as solvent. The final HIPPE structure was obtained from the colloidal dispersion in a sequence including solvent evaporation and annealing. During annealing, driven by the surface tension associated with trapped voids in the dried dispersion and the high chemical potential of copolymer chains in the medium surrounding the particles, the morphology of the system undergoes a reorganization where the particles deform to polyhedrons and the solvent-soluble block of the block copolymer forms a continuous, percolating structure wetting the discrete phase. The volume fraction threshold of this percolating phase is detected by proton conductivity, after doping the poly(2-vinylpyridine) phase with camphorsulfonic acid. The percolation onset was measured at a volume fraction as low as 0.10.

Materials

Polystyrene (PS) and poly(2-vinylpyridine) (PVP) were selected to produce polyHIPEs in which the PVP phase was maintained as the continuous structure. Carboxyl-functionalized PS emulsion particles, having an average diameter of 514 nm and narrow size distribution, were received from the Dow Chemical Co. Swelling experiments in tetrahydrofuran (THF) and differential scanning calorimetry (DSC) experiments indicated that the PS particles were slightly crosslinked. Indeed, the particles, whose glass transition temperature was measured at 108° C., were observed to be swollen without dissolving in THF for a period of 30 days. Two different PS-PVP diblock copolymers were selected for the study. The first, PS-PVP$_1$, had an overall M$_w$=70 000 g/mol with a PVP volume fraction, f$_{PVP}$, of 0.84, determined from the nitrogen content obtained by elemental analysis. (e.g., see Yokoyama, H.; Kramer, E. J. *Macromolecules*, 31, 7871 (1998)). The second similar diblock copolymer was used as received from Polymer Source, Inc., and is referred to herein as PS-PVP$_2$. It had an overall M$_w$=60 000 g/mol, with f$_{PVP}$=0.78. In addition, PVP homopolymers of M$_w$, =8000 g/mol and M$_w$=160 000 g/mol were synthesized by anionic polymerization, following the procedure described elsewhere. (e.g., see Yokoyama et al., *Macromolecules*, 32, 3353 (1999)). For all polymers used, the polydispersity index was lower than 1.1. Camphorsulfonic acid (CSA) (Fluka) was used as a doping agent for the PVP phase, when required by conductivity measurements.

Procedures

Blend Preparation. Ethanol was chosen as a selective solvent for PVP and a nonsolvent for PS. Colloidal dispersions of PS microbeads and PS-PVP block copolymer in ethanol were prepared as follows: PS-PVP block copolymer was added to 5 g of ethanol in various concentrations and dissolved by continuous stirring and gentle heating (e.g., about 60° C.). After cooling the solution down to room temperature, microbeads were added and finely dispersed by continuous sonification for about 60 min. To explore PVP volume ratios between 0.04 and 0.16, the total weight of the dry colloidal system was fixed at 0.1 g, with the block copolymer amount varying between 0.005 and 0.02 g. To slowly evaporate the solvent without inducing boiling of the solution, the temperature was raised to 70° C. (ethanol boiling point 78° C.) at atmospheric pressure. Maintaining these conditions for 24 h allowed all the solvent to be removed. Samples were annealed under vacuum at 140° C., i.e., above the glass transition temperature of both PS microbeads and block copolymer (100° C.) for durations of 3, 7, and 24 h.

Proton conductive HIPPE were produced by doping the PVP block of the block copolymer with CSA by dissolving both the PS-PVP block copolymer and CSA in ethanol. A 1:1 molar ratio of the sulfonic groups to the nitrogen atoms of the PVP was used when preparing the solution. After forming the PVP: CSA complex in the ethanol solution, PS microbeads were added in the required weight fraction and dispersed by continuous sonification for 60 min. Similarly, the same conditions described previously were used for solvent removal and sample annealing.

Transmission Electron Microscopy (TEM). The 100 nm thick films of the final blends were microtomed with a Leica Ultra Cut microtome. The PVP phase was stained for 6 h at room temperature in saturated I$_2$ vapor above solid I$_2$. Micrographs of the final morphologies were taken using a JEOL 2000FX transmission electron microscope operated at 200 kV.

Electrical Conductivity. Electrical conductivity measurements were performed on polymer films of thickness ranging between 1 and 60 μm. Films were cast above a glass substrate with a four-probe gold pattern that was used to measure the resistance. The final specific conductivity was calculated from the measured resistance and thickness of the film. Following the procedure described above, the lowest conductivity, which was possible to be measured for a film of 60 μm in thickness, was of the order of 10$^{-9}$ S/cm. The thickness of the thinnest films was measured by scratching the film with a razor blade and performing atomic force microscopy on the film. The thickness of the thickest films was determined by peeling the film off the substrate and measuring it with optical microscopy.

Dynamic Light Scattering. To measure the size of the block copolymer micelles in solution in ethanol, dynamic light scattering experiments (DLS) were performed using a Brookhaven Instruments system. Solutions of 0.5% PS-PVP by weight in ethanol were prepared and analyzed. Successively, to form the PS-PVP:CSA complex, CSA was added to the solution in the needed concentration, and continuous stirring was maintained for 30 min, after which measurements were performed at room temperature.

Results

An electron micrograph of the colloidal system formed by blending PS latex particles with PS-PVP$_1$ block copolymer (to a nominal copolymer volume fraction of 0.15) after solvent removal and prior to annealing shows a disordered structure, where the block copolymer forms a discrete phase (the dark stained phase is the PVP block of the PS-PVP). The clear phase includes both the unstained PS colloidal particles and voids. Since the solvent is removed at room temperature, which is below the glass transition temperature of both PS and PVP, the colloidal spheres will pack similarly to hard spheres in a box, leaving some empty space in between. Owing to the low volume fraction of the block copolymer phase (lower than 0.26), these voids will be only partially filled by the block copolymer phase. Thus, although an interface between PVP and PS is generated, the free surface of the PS particles can only be partially wet by the diblock copolymer. Therefore, both surface (against air) and interface energy will contribute to the energetic status of the dry colloidal system.

TEM micrographs of the structure observed after annealing shows a similar structure, with annealing times of 3, 7, and 24 h at 140° C. Although some refinement in the block copolymer distribution can be observed during the 24 h, the final morphology is achieved in a relatively short time and the final structure is stable enough to maintain the same morphology at 140° C. By comparison with the first micrograph, it is clear that, upon annealing, the colloidal particles undergo a strong rearrangement, deforming to polyhedrons wet by a continuous PVP phase. During this process, the block copolymers redistribute, segregating to the surface of the particles and coating them more or less uniformly to decrease the excess free energy associated with the PS-PVP interfacial area in the micelles and between the PS colloids and the PVP coronae of the micelles. Concurrently, the PS colloidal spheres deform into polyhedral shapes to eliminate remaining voids. The resulting geometric HIPPE obtained had an approximate volume composition of 0.87 PS and 0.13 PVP. The unique features of this composition are that (i) the particles are uniform in size and (ii) the dispersed majority phase is not interpenetrating. This allows the use of these HIPPEs as barrier materials, where an expensive polymer having barrier properties could be used in very low volume fraction and still provide the blend with needed barrier properties.

While not being limited to any particular theory, the driving forces leading to the rearrangement of the morphology of the colloidal system under annealing may be described as follows. Keddie et al. have investigated the deformation of colloidal systems under annealing. (e.g., see Keddie et al., *Langmuir*, 12, 3793 (1996)) After drying colloidal dispersions with procedures similar to that used in those of the above examples, and annealing the system at temperatures above the glass transition temperature of the latex, they showed that the colloidal particles deform, leading to a consolidation of the system and closure of the voids left after solvent evaporation. The driving force for this rearrangement was shown to be the reduction of surface energy associated with the free surfaces of the colloidal particles. A similar explanation can be used to explain the rearrangement in morphology observed by others upon annealing core/shell hydrophobic latex films (e.g., see Dos Santos et al., *J. Polym. Sci., Part B*, 38:2989 (2000)) or by solution casting of dispersions formed by poly (divinylbenzene) colloidal particles with polystyrene chains grafted on their surface. (e.g., see Zheng et al., *Macromolecules*, 35:6828 (2002)). In those cases, the colloidal systems reorganized into a two-phase morphology, where the core of the particles was maintained as a dispersed phase embedded in a continuous phase obtained by the consolidation of the shells of the latex particles. Therefore, in those cases, the energy gained by reducing the total free surface of the system leads to the observed change in morphology. However, in the example compositions formed in accordance with the embodiments of the present invention, the rearrangement of the morphology is also driven by the reduction of the interfacial free energy associated with the PS-PVP interface. Indeed, if the only driving force were the reduction in PS surface energy, the colloid would close the voids by entrapping the block copolymer into a dispersed phase, leading to a final morphology similar to that observed prior to annealing. On the contrary, the block copolymers segregate rapidly to the free particle surfaces, evidently because chains transferred from a bulk mesophase to the surface of a PS particle can relieve both stretching energy and PS-PVP interfacial energy. Simultaneous with this wetting by copolymers, the particles deform into polyhedral structures.

Electron micrographs were made of the structures of HIPPEs obtained by including PVP homopolymers in the percolating phase. The blends were obtained with the above procedure, with the difference that PVP homopolymer was dissolved together with PS-PVP block copolymer in the ethanol solution. Solvent was then removed as described previously, and samples were annealed under vacuum for 7 h at 140° C. To have dry and wet brush conditions on the PVP block side of the interface, both low and high molecular weight PVP homopolymers were considered. The wet brush condition was obtained by swelling the PVP block side of the interface with a 8000 g/mol PVP homopolymer. An electron micrograph shows the morphology obtained for the dry brush condition, realized by adding 160,000 g/mol homopolymer PVP. In both cases the composition of the dry blends was maintained at 0.85 PS colloid, 0.08 PS-PVP$_1$ block copolymer, and 0.07 PVP homopolymer by volume. The most ordered structure was obtained by using low molecular weight PVP. This result can be attributed to the higher interpenetration of the low molecular weight homopolymer into the PVP block, characteristic of wet brush conditions, and is in agreement with results reported previously for HIPPE obtained by an emulsion process.

EXAMPLE 2

Preparation of HIPPE with Proton Conductivity

The continuous phase of the HIPPE can be utilized for specific mechanical, rheological, or transport applications, for example to conduct electrons or protons. Proton conductivity proves to be a way to detect the threshold for percolation of the PVP phase. In the present examples, to determine percolation effects, the continuous phase was doped with CSA and then the ionic conductivity of the final blend was measured. As set forth above, the colloidal dispersion was prepared in ethanol, but CSA was added and dissolved in the solution at a concentration corresponding 1:1 molar ratio of the sulfonic groups to the nitrogen atoms of the PVP. Thus, if the PVP and CSA form a strong complex already in solution, the surfactant used to create the percolating structure will no longer be the block copolymer but the PS-PVP$_2$:CSA complex. Owing to the overlapping of sulfonic and aromatic groups in Fourier transform infrared spectroscopy, dynamic light scattering was preferred to demonstrate the formation of the PS-PVP$_2$:CSA complex. The correlation functions obtained by DLS at room temperature for a 0.5 wt % solution of the PS-PVP$_2$ in ethanol and the PS-PVP$_2$:CSA in ethanol were measured and compared. In the former case micelles are detected whose average measured diameter is 65 nm. However, by introducing CSA, the measured diameter of the micelles increases to 102 nm. This is a consequence of the fact that the PVP$_2$ micelle coronae are swollen by the CSA and thus confirms that the PVP$_2$:CSA is formed in solution in ethanol.

This PVP$_2$:CSA complex was shown to be conductive by performing conductivity measurements on dried PS-PVP$_2$:CSA films. The specific conductivity had a measured value of $6\times10^{-6}$ S/cm. To measure the percolation threshold of the continuous phase, conductivity measurements on the PS/PSPVP$_2$:CSA blends were performed using the procedure described above. FIG. 1 shows the specific (proton) conductivity of the different polyHIPEs measured as a function of the volume fraction of the PVP: CSA phase. As it can be noted, conductivity starts to be measurable at a volume fraction of PVP:CSA between 0.08 and 0.12. This is consistent with the results shown in parts a and b of FIG. 2, respectively. At a volume fraction of 0.08 PVP:CSA (FIG. 2a), the PVP: CSA phase is not continuous, and it is not surprising that no conductivity is measured. However, by increasing the PVP:CSA volume fraction up to 0.12 (FIG. 2b), a continuous conductive phase is observed and an overall conductivity of $4\times10^{-7}$ S/cm was measured, as shown in FIG. 1. The volume fraction of the continuous phase at the percolation threshold can be adjusted, for example, by changing the length of the PVP block. A longer block can be used when greater conductivity is desired.

EXAMPLE 3

Preparation of a HIPPE Containing PS 0.5 Microns Particles in PS-PVP Block Copolymer Polymer B is omitted, polymer A is polystyrene (PS) and the AB diblock copolymer is polystyrene-polyvinylpyridine (PS-PVP). In this example, 0.06 grams of HY48 (PVP-PS block copolymer, Mw=70000, 16% fraction of PVP) are dissolved in 5 grams of ethanol, with gentle heating. The solution is cooled to room ambient temperature. Micelles are formed, indicating a high chemical potential of the block copolymer in the selected solvent. 0.24 grams of crosslinked PS microbeads (0.5 microns, COOH surface functionality) is dispersed in the solution by sonicating the solution for 60 minutes. The solution is then evaporated at atmospheric pressure and 75° C., which is lower than the boiling point of ethanol at 78° C. The final blend has a minimum PS/PVP volume ratio of 0.832/0.168, since parts of the block copolymer migrate and attach to the glass surface of the vessel. The dried blend was annealed for approximately 7-10 hours at 140° C., which is higher than the glass transition temperature, (Tg) of the block copolymer, which is approximately 100° C., or the PS microbeads, which is 108° C. A T.E.M. micrograph of the composition of this example shows darker regions corresponding with the continuous PVP phase, and the lighter regions corresponding with the discrete PS phase. The cellular PS phase is on the order of a few hundred nm.

EXAMPLE 4

Preparation of HIPPE Containing PS 0.5 Microns Particles in PVP and PS-PVP Block Copolymer Polymer B is PVP, polymer A is polystyrene (PS) and the AB diblock copolymer is polystyrene-Polyvinylpyridine (PS-PVP). 0.03 grams of HY48 (PVP-PS block copolymer, Me=70,000, 16% fraction of PVP) and 0.03 grams of PVP (Mw=10000) were dissolved in 5 grams of ethanol, with gentle heating. The solution was then cooled to room temperature. 0.24 grams of crosslinked PS microbeads (0.5 microns, COOH surface functionality) was dispersed in the solution by sonicating the solution for approximately 60 minutes. The solution was evaporated at atmospheric pressure and 75° C., which is lower than the boiling point of ethanol at 78° C. The final blend has a minimum PS/PVP volume ratio of 0.832/0.168, since part of the block copolymer migrated and attached to the glass surface of the vessel. The dried blend was annealed for approximately 7-10 hours at 140° C., which is higher than the glass transition temperature, (Tg) of the block copolymer, which is approximately 100° C., or the PS microbeads, which is 108° C. A T.E.M. micrograph shows that the darker regions correspond with the continuous PVP phase, and the lighter regions correspond with the discrete PS phase. The cellular PS phase is on the order of a few hundred nm, as indicated by the 100 nm scaling legend.

EXAMPLE 5

Preparation of HIPPE Containing PS 0.2 Microns Particles in PS-PVP Block Copolymer Polymer B is omitted, polymer A is polystyrene (PS) and the AB diblock copolymer is polystyrene-Polyvinylpyridine (PS-PVP). 0.06 grams of HY48 (PVP-PS block copolymer, Mw=70000, 16% fraction of PVP) are dissolved in 5 grams of ethanol, with gentle heating. The solution is cooled to room ambient temperature. Micelles are formed, indicating a high chemical potential of the block copolymer in the selected solvent. 0.24 grams of crosslinked PS solution by sonicating the solution for 60 minutes. The solution is then evaporated at atmospheric pressure and 75° C., which is lower than the boiling point of ethanol at 78° C. The final blend has a minimum PS/PVP volume ratio of 0.832/0.168, since part of the block copolymer migrates and attached to the glass surface of the vessel. The dried blend was annealed for approximately 7-10 hours at 140° C., which is higher than the glass transition temperature, (Tg) of the block copolymer, which is approximately 100° C., or the PS microbeads, which is 108° C. A T.E.M. micrograph shows the darker regions corresponding with the continuous PVP phase, and the lighter regions corresponding with the discrete PS phase. The cellular PS phase is on the order of a few hundred nm, as indicated by the 200 nm scaling legend.

EXAMPLE 6

Preparation of Semiconducting Polymer Blends

To drive the semiconducting phase into a more efficient structure without the need for spin-casting, a low-volume fraction, continuous PVP phase was designed, which was hosted in a high-volume fraction dispersed polystyrene phase (PS). Within the PVP phase, a second percolation of the PANI-PSA was induced. The PVP:PS blend was obtained by self-assembly of cross-linked PS colloidal particles (500 nm in diameter) with a narrow size distribution and asymmetric PS-PVP block copolymers (molecular mass 60,000 g/mol, $f_{pvp}$=0.78). PS and PS-PVP were dispersed in formic acid, in proportions so as to maintain a high ratio of PS (including the PS block of PS-PVP) to PVP, roughly 9:1. Because formic acid is a nonsolvent for PS and a good solvent for PVP, a uniform dispersion of PS colloidal particles and PS-PVP micelles was obtained. However, after complete solvent evaporation, the system consisted of a lattice of closely packed spheres, voids, and a block copolymer phase. The maximum volume fraction for packing monodisperse spheres into a hexagonal close-packed or face-centered cubic lattice is 0.74 (e.g., see Rutgers et al., *Phys. Rev. B.* 53, 5043 (1996)). The remaining 0.26 volume fraction could be only partially filled by the PS-PVP phase, because of the low volume fraction used in our formulation. Thus, the dry system was left in a configuration of high energy: the surface energy associated with voids and the interfacial energy of the PS/PVP interface. When the system was annealed at temperatures above the $T_g$ of all the components, it assembled into a configuration of lower free energy.

The PS-PVP blends obtained this way constitute an ideal precursor for semiconducting polymer blends, because the PVP phase is maintained continuously at a volume fraction as low as 0.10. If this phase is loaded with PANI-PSA, then according to Eq. 2 a 10-fold reduction in $f_p$ as compared with that of the binary PANI-PSA:PVP blends is expected. Furthermore, because the colloidal particles are cross-linked, coalescence would be impeded and the morphologies would be preserved at high temperatures. To achieve a directed assembly of PANI-PSA within the continuous PVP phase, PS colloidal particles and PS-PVP were cast from a formic acid bath to which PANI-PSA had been previously dissolved in the required amount. After solvent removal and before annealing, the morphology of the dry blend was similar to that of the dry system without PANI-PSA, but with the PANI-PSA phase finely dispersed within the PVP phase. After the system was annealed, the PANI-PSA was maintained as a finely dispersed phase within the PVP domain, which redistributed to form a continuous phase (FIG. 2).

Figure 2:
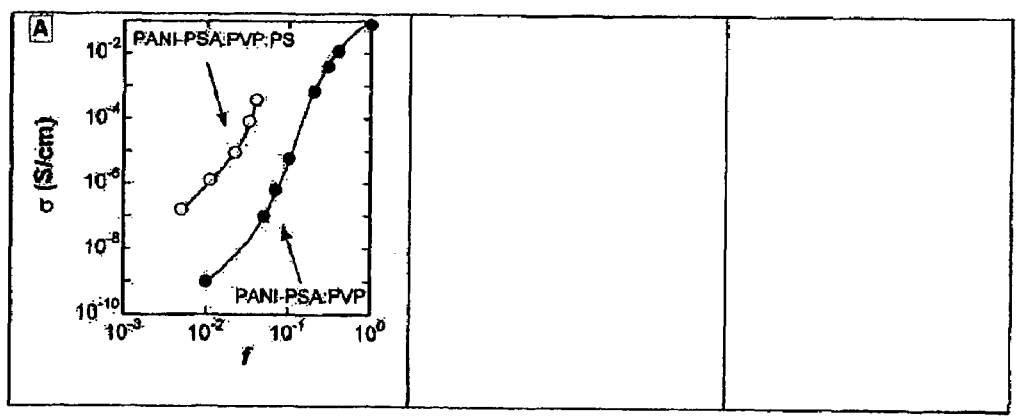
FIG. 2 is a graph showing conductivity values as a function of the volume fraction f of PANI-PSA, for a conventional binary PANI-PSA:PVP system (solid circles) and a ternary PANI-PSA:PVP:PS blend (open circles).

FIG. 2 shows the conductivity values as a function of the volume fraction f of the PANI-PSA, for a conventional binary PANI-PSA:PVP system (solid circles) and a ternary PANI-PSA:PVP:PS blend (open circles). By fitting Eq. 1 to the measured σ values for the ternary blend, it was determined that $f_p$=0.011 and t=3.96, suggesting double percolation. For f values between the percolation thresholds of the ternary and binary system, i.e., 0.011<f<0.12, the gain in σ is between three and four orders of magnitude. The nonnegligible conductivity below the percolation threshold is the result of the residual solubility of PANI-PSA in PVP. As a consequence of the decrease in $f_p$, blends with doping concentrations in between the percolation threshold of the ternary blend and that of the binary blend showed marked gains in electrical conductivity. In the case of a PANI-PSA:PVP pair, the increase in electrical conductivity at a given PANI-PSA concentration was in the range of three to four orders of magnitude (FIG. 9A) and is expected to reach even larger values in pairs with lower solubility. Below percolation of PANI-PSA in PVP, the binary system showed low conductivities, which may be attributed to the residual solubility of the doped pi-conjugated polymer in the chaperone polymer. This is consistent with the conspicuous drop in the $T_g$ of the PVP phase ($\Delta T_g$=−17° C. for 0.3:0.7 PANI-PSA:PVP), as measured by differential scanning calorimetry in PANI-PSA:PVP binary blends.

Compared to the binary PANI-PSA:PVP blends, confining the doped pi-conjugated polymer within a low-volume fraction chaperone phase reduced the concentration of the conductive component at percolation onset by a factor of 10. However, $f_p$ may be reduced further if block copolymers with shorter blocks of the chaperone phase are used. In addition, solubility of the doped pi-conjugated polymer in the chaperone phase may be exploited in ternary blends to design a single, continuous conducting phase. Through the use of miscible doped-pi-conjugated/chaperone polymer pairs and the same procedures in self-assembly of doped-colloidal/block-copolymer systems, semiconducting organic-blend systems are obtained in which the percolation threshold in the continuous phase approaches zero.

The method described here remains advantageous whether a double percolating structure or a soluble single phase is desired. The process in accordance with the embodiments can be applied to any host/doped—pi-conjugated polymer pair, provided that a block copolymer can be synthesized in which one block is compatible with the surface of the colloidal system and the other can host the doped pi-conjugated macromolecule. Because the solvent options are greater when cross-linked colloids are used, this route offers an appealing strategy to improve many of the available semiconducting binary polymer blends.

As will be understood by those skilled in the art, the present invention may be embodied in other specific forms without departing from the essential characteristics thereof. Those skilled in the art will recognize, or be able to ascertain using no more than routine experimentation, many equivalents to the specific embodiments of the invention described herein. Such equivalents are intended to be encompassed by the following claims.

What is claimed is:

1. A high internal phase emulsion composition comprising a disrete phase, comprising:
    component A, wherein component A is a polymer, monomer or mixture thereof in the form of a colloidal dispersion;
    a continuous phase comprising component B, wherein component B is a polymer; and
    component C, wherein component C is a compatibilizer selected from the group consisting of surfactants, block copolymers, random copolymers and graft copolymers;
wherein the composition is produced by a process, comprising
    dissolving component B and component C in a selective solvent for polymer B to form a solution, wherein the selective solvent comprises an alcohol;
    dispersing component A within the solution, wherein the dispersing comprises sonification of the solution; and
    removing the selective solvent from the solution to form a dried polymeric high internal phase emulsion composition.

2. The composition of claim 1 wherein the components C and A are immersible within each other.

3. The composition of claim 1 wherein component C is a surfactant.

4. The composition of claim 1 wherein component A is formed of a monomer selected from the group consisting of styrene, vinyl toulene, alphamethyl styrene, divinyl benzene, isoprene, butadiene, methyl methacrylate, acrylonitrile, vinyl chloride, vinyl acetate, maleic anhydride, and thermoset monomers.

5. The composition of claim 1 wherein component A is a polymer selected from the group consisting of polyethylenes, polypropylenes, copolymers of ethylene and propylene, copolymers of ethylene, polystyrenes, ethylene styrene, copolymers of styrene, polybutadienes, polyisoprenes, polyvinyl chlorides, vinyl chloride copolymers, polyamides, polyimides, polycarbonates, polyesters, polyarylates, acrylic polymers and copolymers, polyethers, polyethylene glycol, polypropylene glycol, polyphenylene oxides, polyphenylene sulfones, polyvinylidine chlorides, polyvinylidine fluorides, rubbers, partially polymerized thermosets, silicone rubbers, thermoplastic polyolefin rubbers, and polyurethanes.

6. The composition of claim 1 wherein component A comprises between greater than 0 and less than 100% by volume of the composition.

7. The composition of claim 1 wherein component A is poly-(2,6-dimethyl-p-phenylene oxide).

8. The composition of claim 1 wherein component A is a monomer comprising one or more components selected from the group consisting of cross-linking agents, catalysts, or polymerization advancers.

9. The composition of claim 1 wherein component A and component B are thermoplastic polymers.

10. The composition of claim 1 wherein component A, component B or components A and B are thermoset polymers.

11. The composition of claim 1 wherein component A and component B are thermoplastic olefins and component C is an olefinic copolymer.

12. The composition of claim 1 wherein component B is selected from the group consisting of polyethylenes, polypropylenes, copolymers of ethylene and propylene, copolymers of ethylene with higher alpha-olefins, polystyrenes, ethylene styrene, copolymers of styrene, polybutadienes, polyisoprenes, polyvinyl chlorides, vinyl chloride copolymers, polyamides, polyimides, polycarbonates, polyesters, polyarylates, acrylic polymers and copolymers, polyethers, polyethylene glycol, polypropylene glycol, polyphenylene oxides, polyphenylene sulfones, polyvinylidine chlorides, polyvinylidine fluorides, rubbers, partially polymerized thermosets, silicone rubbers, thermoplastic polyolefin rubbers, polyurethanes, and conjugated polymers.

13. The composition of claim 1 wherein component B is selected from the group consisting of polythiophenes, polypyrroles, polyanilines, polyfluorenes, polyvinylcarbazole, polyethylenedioxythiophene:polystyrenesulfonate.

14. The composition of claim 1 wherein components C and A are immiscible within each other.

15. The composition of claim 1 wherein C is more miscible in B than in A.

16. The composition of claim 1 wherein the composition is electrically or ionically conducting.

17. The composition of claim 1 wherein the composition comprises a bioactive agent and/or biodegradable polymer.

18. The composition of claim 1 which is insulating or forms a barrier.

19. The composition of claim 1 wherein the alcohol is ethanol.

20. The composition of claim 19 wherein the selective solvent further comprises water.

* * * * *